(12) United States Patent
Takada et al.

(10) Patent No.: US 10,491,530 B2
(45) Date of Patent: Nov. 26, 2019

(54) COMMUNICATION SYSTEM AND COMMUNICATION DEVICE

(71) Applicants: National University Corporation Nagoya University, Nagoya-shi, Aichi (JP); AutoNetworks Technologies, Ltd., Yokkaichi-shi, Mie (JP); Sumitomo Wiring Systems, Ltd., Yokkaichi-shi, Mie (JP); Sumitomo Electric Industries, Ltd., Osaka-shi, Osaka (JP)

(72) Inventors: Hiroaki Takada, Nagoya (JP); Ryo Kurachi, Nagoya (JP); Naoki Adachi, Yokkaichi (JP)

(73) Assignees: National University Corporation Nagoya University, Nagoya-shi, Aichi (JP); AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(*) Notice: Subject to any disclaimer, the term of this patent is extended or adjusted under 35 U.S.C. 154(b) by 0 days.

(21) Appl. No.: 15/528,456

(22) PCT Filed: Nov. 18, 2015

(86) PCT No.: PCT/JP2015/082348
§ 371 (c)(1),
(2) Date: May 19, 2017

(87) PCT Pub. No.: WO2016/080421
PCT Pub. Date: May 26, 2016

(65) Prior Publication Data
US 2017/0324675 A1 Nov. 9, 2017

(30) Foreign Application Priority Data
Nov. 20, 2014 (JP) ................. 2014-235783

(51) Int. Cl.
*H04L 12/28* (2006.01)
*H04L 12/801* (2013.01)
*H04L 12/40* (2006.01)

(52) U.S. Cl.
CPC ........ *H04L 47/34* (2013.01); *H04L 12/40026* (2013.01); *H04L 12/40163* (2013.01);
(Continued)

(58) Field of Classification Search
CPC ........... H04L 47/34; H04L 2012/40273; H04L 2012/40215; H04L 12/801
See application file for complete search history.

(56) References Cited

U.S. PATENT DOCUMENTS

| | | | |
|---|---|---|---|
| 8,456,993 B1* | 6/2013 | Bharghavan | H04L 47/10 370/232 |
| 2004/0100964 A1* | 5/2004 | Robotham | H04L 1/1809 370/394 |

(Continued)

FOREIGN PATENT DOCUMENTS

| | | |
|---|---|---|
| JP | 2006316739 A | 11/2006 |
| JP | 2013074426 A | 4/2013 |
| JP | 2013162403 A | 8/2013 |

OTHER PUBLICATIONS

Search Report for International Application No. PCT/JP2015/082348, dated Jan. 19, 2016, 2 pp.

*Primary Examiner* — Abdelillah Elmejjarmi
(74) *Attorney, Agent, or Firm* — Honigman LLP

(57) ABSTRACT

Provided are a communication system and a communication device that allow a reception node to estimate delay time, a generation time point or the like of a message. A delay time estimation part in an ECU determines whether a message received by itself is transmitted in sequence with another message without being provided with time information by a transmission node. If the received message is transmitted in (Continued)

sequence with another message, the received message may be delayed due to arbitrary processing. Thus, the delay time estimation part checks the priority of one or more sequential messages preceding the received message, and estimates delay time of the received message occurring due to the arbitrary processing in accordance with the priority of each message. A generation time point estimation part estimates the time point when the received message is generated by an ECU, based on the delay time estimated.

6 Claims, 8 Drawing Sheets

(52) U.S. Cl.
CPC ............... *H04L 2012/40215* (2013.01); *H04L 2012/40273* (2013.01)

(56) References Cited

U.S. PATENT DOCUMENTS

| | | | |
|---|---|---|---|
| 2006/0259231 A1 | 11/2006 | Ichikawa et al. | |
| 2010/0329309 A1* | 12/2010 | Tsui ................... | H04L 25/03057 375/130 |
| 2011/0217982 A1* | 9/2011 | Zhao ..................... | H04W 60/04 455/437 |
| 2013/0139018 A1* | 5/2013 | Takada .................. | H04L 12/407 714/748 |
| 2014/0328352 A1* | 11/2014 | Mabuchi ............. | H04L 12/4035 370/451 |
| 2015/0063120 A1* | 3/2015 | Horvath ................ | H04L 47/283 370/237 |
| 2015/0078351 A1* | 3/2015 | An ........................ | H04W 28/22 370/336 |
| 2016/0134544 A1* | 5/2016 | Roy ....................... | H04L 47/14 370/235 |

* cited by examiner

COMMUNICATION SYSTEM AND COMMUNICATION DEVICE

CROSS-REFERENCE TO RELATED APPLICATIONS

This application is the national phase under 35 U.S.C. § 371 of PCT International Application No. PCT/JP2015/082348 which has an International filing date of Nov. 18, 2015 and claims priority to Japanese Application No. 2014-235783 filed on Nov. 20, 2014.

FIELD

The present disclosure relates to a communication system in which multiple communication devices transmit and receive messages, and to a communication device configuring the system.

BACKGROUND

Conventionally, a communication protocol of Controller Area Network (CAN) has widely been employed in communication among multiple electronic control units (ECUs) mounted in a vehicle. A communication system with the CAN communication protocol is so configured that multiple ECUs are connected to a common CAN bus, and transmission/reception of messages are performed by an ECU at the reception side obtaining a signal output to the CAN bus by an ECU at the transmission side.

Furthermore, in the case where multiple ECUs simultaneously transmit messages which then collide against each other on the CAN bus, adjustment (arbitration) processing is carried out between communication devices based on CAN-IDs attached to the messages. Due to the arbitration processing, a message with a CAN-ID of a high priority is transmitted first and therefore the transmission of the message with a CAN-ID of a low priority is delayed. Since the arbitration processing may cause a delay of a message, the ECU that received the message cannot know the time when this message was generated (or the time when the message was tried to be transmitted first).

Japanese Patent Application Laid-Open Publication No. 2006-316739 proposes a distributed control system configured to transmit a time synchronization message for instructing that an actuator driving electronic control device obtains sensor information of an inlet valve stroke sensor while an engine controlling electronic control device obtains sensor information from an inlet throttle sensor at the same timing, the actuator driving electronic control device obtaining sensor information of an inlet valve stroke sensor based on the timing instructed by the time synchronization message and transmitting the obtained sensor information to the engine controlling electronic control device together with the time of obtainment.

SUMMARY

The distributed control system according to Japanese Patent Application Laid-Open Publication No. 2006-316739, however, has such a problem of additionally using a limited payload of messages since time information needs to be attached to a message for transmission. Moreover, in order to implement the distributed control system, a CAN controller or the like included in the communication device needs to have a function of transmitting/receiving a message with time information at both the transmission and reception sides of the message. In some cases, it is necessary for the CAN controller in each one of the communication devices included in a communication system to have such a function. This causes problems of significantly increased cost and low feasibility for implementing the distributed control system according to Patent Document 1 for the existing CAN communication system.

The present disclosure has been made in view of the circumstances described above, and aims to provide a communication system and a communication device that can estimate delay time or a generation time point of a message, and can implement an estimating function at low cost.

In a communication system according to an aspect of the present disclosure comprising: a plurality of communication devices connected to each other via a common communication line, and each including a message generation part generating a message with information concerning a priority, a message transmission part outputting a signal in accordance with a message generated by the message generation part to the communication line to transmit the message and a message reception part obtaining a signal by sampling for the communication line to receive a message concerning the signal in accordance with the information; and an arbitration part arbitrating an order of transmission in accordance with a priority of the message in the case where transmission of messages by the communication devices collide against each other, the plurality of communication devices transmitting/receiving a message to/from each other via a common communication line, at least one of the communication devices comprises: a determination part determining whether or not a message received by the message reception part is transmitted in sequence with another message; and a delay time estimation part estimating, if the determination part determines that the received messages are sequentially transmitted, delay time of the received message caused by the arbitration of the arbitration part in accordance with the priority of sequential one or more messages preceding the received message.

Moreover, in the communication system according to another aspect of the present disclosure, the delay time estimation part is configured to estimate delay time in accordance with a transmission time period for another message with a high priority sequentially preceding the received message.

Moreover, in the communication system according to another aspect of the present disclosure, the at least one communication device includes a generation time point estimation part estimating a time point when the received message is generated by the message generation part, based on the time estimated by the delay time estimation part.

Moreover, in the communication system according to another aspect of the present disclosure, the generation time point estimation part estimates a time point when a message is generated, on a basis of: delay time from time when a message is generated by the message generation part to time when the message is transmitted by the message transmission part; delay time estimated by the delay time estimation part; a time period from start to end of message transmission; and delay time from completion of message transmission by a communication device on the transmission side to completion of message reception by a communication device on the reception side.

Moreover, in the communication system according to another aspect of the present disclosure, if an interval between a time point when transmission of one message is completed and a time point when transmission of a subsequent message is started is less than a predetermined period of time, the determination part determines that the two messages are sequentially transmitted.

Moreover, in the communication system according to another aspect of the present disclosure, for a message detected as at least being sequentially transmitted, the at least one communication device has a history storage part storing a history of message transmission including information concerning a time point when the message is transmitted and a priority of the message, and the determination part is configured to make a determination based on the history stored in the history storage part.

Moreover, in a communication device according to another aspect of the present disclosure connected to a different device via a common communication line, comprising: a message generation part generating a message with information concerning a priority; a message transmission part outputting a signal in accordance with a message generated by the message generation part to the communication line to transmit the message; a message reception part obtaining a signal by sampling for the communication line to receive a message concerning the signal in accordance with the information; and an arbitration part arbitrating an order of transmission in accordance with a priority of the message in a case where transmission of messages collide against each other between the communication device and the different device, the communication device transmitting a message to the different device and receiving a message from the different device via a common communication line, further comprising: a determination part determining whether or not a message received by the message reception part is transmitted in sequence with another message; and a delay time estimation part estimating, if the determination part determines that the received message is sequentially transmitted, delay time of the received message caused by arbitration of the arbitration part in accordance with a priority of sequential one or more messages preceding the received message.

According to an aspect of the present disclosure, each of the communication devices included in the communication system generates and transmits a message with information concerning a priority (CAN-ID, for example) to a different one of the communication devices, and also receives the message transmitted by the different one of the communication devices. In the case where multiple communication devices transmit messages at the same time and the transmission of messages collide against each other, adjustment (arbitration) processing in the order of transmission is carried out in accordance with the priorities of messages. In the communication system configured as described above, at least one of the communication devices performs processing of estimating delay time of a message, as described below.

At least one of the communication devices detects sequential transmission of messages to a communication line, and determines whether or not a message received by the communication device itself is transmitted in sequence with another message. If the received message is transmitted in sequence with another message, the received message may be delayed due to arbitration processing. The communication device then checks the priority of one or more sequential messages preceding the received message, and estimates delay time of the received message due to the arbitration processing in accordance with the priority of each message.

Such a configuration of estimating the delay time of a message eliminates the need for the communication device which transmits the message to perform any special processing, and therefore such a function may be mounted only to the communication device which is required to estimate delay time of a received message. As feature expansion for the conventional communication system may be performed only for a required communication device, the present communication system may be implemented at low cost.

In the case where other sequential messages preceding the received message have a higher priority than that of the received message, it is possible that the received message is delayed because of collision against these other messages. On the other hand, if the priorities of other messages are lower than the priority of the received message, the transmission of the received message is prioritized in the arbitration processing, and thus the received message is not delayed due to collision against other messages. According to another aspect of the present disclosure, therefore, delay time is estimated in accordance with a transmission time period for other sequential messages with a high priority preceding the received message.

This allows a communication device to estimate whether or not the received message is delayed due to arbitration processing and to estimate delay time due to arbitration processing.

According to another aspect of the present disclosure, a time point when the received message is generated by a communication device which transmitted the message is estimated based on an estimated result of the delay time of the received message.

A time point of message generation may be estimated based on, for example, the delay time from the time when the message is generated to the time when the message is transmitted by the communication device on the transmission side, the delay time due to arbitration processing, a time period from the start to the end of message transmission (i.e. time required for transmitting the message), and the delay time from the time when transmission of a message is completed by the communication device on the transmission side to the time when reception of the message by the communication device on the reception side is completed. It is noted that the delay time from generation to transmission of a message or the delay time from the time when transmission of a message by the communication device on the transmission side is completed to the time when reception of the message by the communication device on the reception side is completed may be determined in advance for a design or experimental purpose, and may be provided to the communication devices as constant values.

This allows the communication device to estimate the time point of message generation and to use the estimated time point by setting the estimated time point as a synchronized time point with another communication device or by performing arithmetic operation processing for control in consideration of the difference between the time point of reception and the estimated time point.

According to another aspect of the present disclosure, the communication device determines whether or not multiple messages are transmitted in sequence, as described below. If the interval between the time point when transmission of one message is completed and the time point when transmission of the subsequent message is started is less than a predetermined period of time, the communication device determines that these two messages are in sequence. This allows the communication device to easily detect sequential transmission of messages.

According to another aspect of the present disclosure, for at least a message which is detected as being transmitted in sequence with another message, the communication device stores information concerning a transmission time point and the priority of the message. This allows the communication device to perform, in the case of receiving a message, processing of, for example, determining whether or not the received message is transmitted in sequence with another message and estimating delay time based on the priority of another message transmitted in sequence with the received message.

According to an aspect of the present disclosure, the configuration in which delay time of a message occurring due to arbitration processing is estimated eliminates the need for feature expansion in all the communication devices included in the communication system and requires feature expansion only in the communication device which needs time estimation, thereby implementing the communication system capable of estimating a time point of message generation at low cost.

The above and further objects and features will more fully be apparent from the following detailed description with accompanying drawings.

DETAILED DESCRIPTION

Embodiment 1

Figure 1:
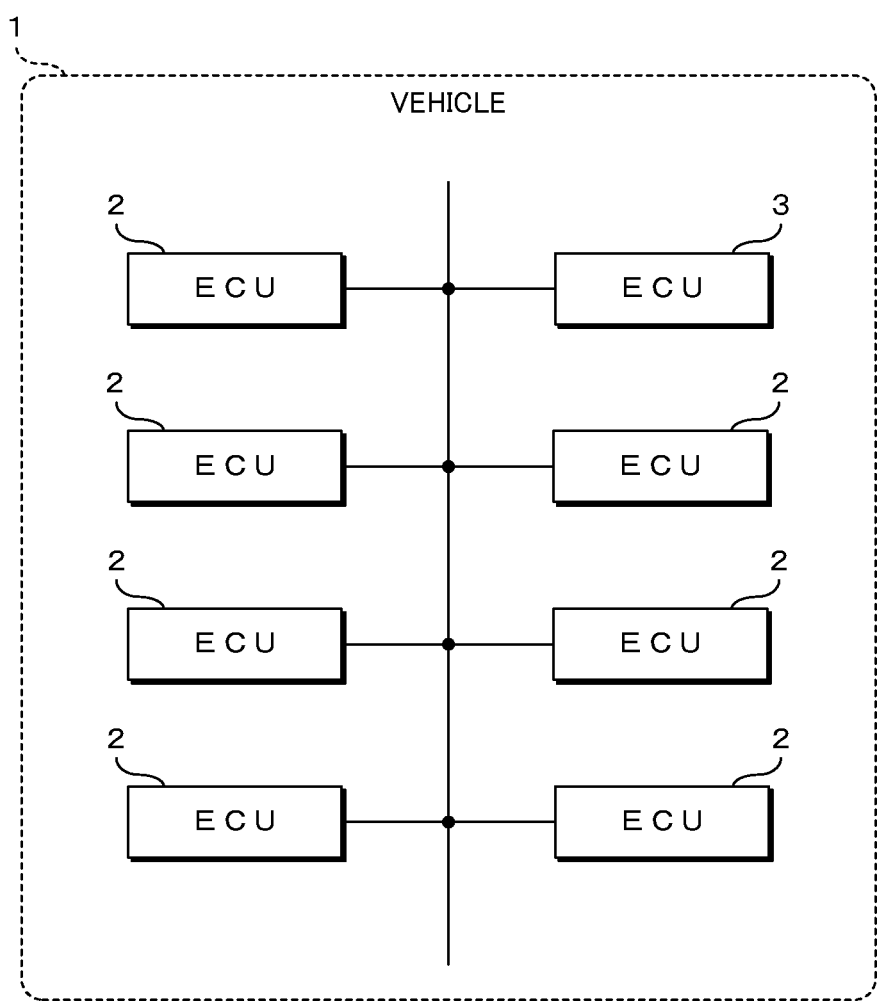
FIG. 1 is a schematic diagram illustrating a configuration of a communication system according to Embodiment 1.

FIG. 1 is a schematic diagram illustrating a configuration of a communication system according to Embodiment 1. The communication system according to Embodiment 1 is configured by comprising one or more ECUs 2 and one or more ECUs 3 that are mounted on a vehicle 1. The ECUs 2 and 3 are connected with one another via a common communication line installed in the vehicle 1, and can transmit and receive messages to/from one another. According to the present embodiment, a CAN bus is employed as the communication line, and the ECUs 2 and 3 perform communication according to the CAN protocol. The ECUs 2 and 3 may be, for example, various electronic control devices such as an engine ECU controlling the engine of the vehicle 1, a body ECU controlling an electric component of a vehicle body, an ABS-ECU performing control related to an antilock brake system (ABS) or an air bag ECU controlling an air bag of the vehicle 1.

According to the present embodiment, the ECU 2 and the ECU 3 have differences in the features related to communication. The ECU 2 performs CAN communication as in the conventional case. In comparison, the ECU 3 has, in addition to the CAN communication as in the conventional case, a function of estimating, in the case of receiving a message, a time point of message generation. While FIG. 1 illustrates the communication system configured to comprise seven ECUs 2 and one ECU 3, the illustrated number of ECUs 2 and 3 is a mere example, and is not limited thereto. For example, all the ECUs included in the communication system may be the ECUs 3. The communication system requires at least one ECU 3.

Figure 2:
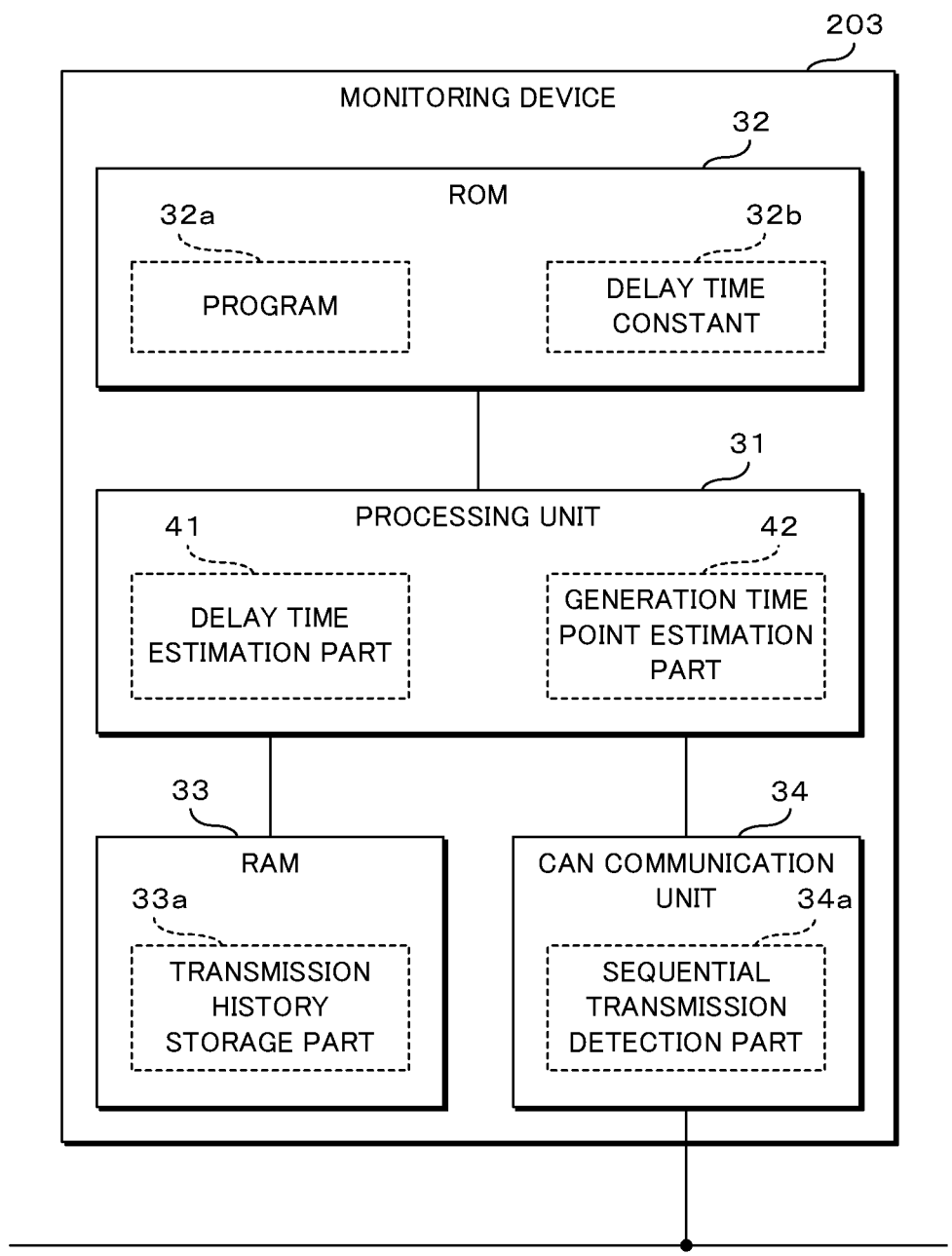
FIG. 2 is a block diagram illustrating a configuration of an ECU.

FIG. 2 is a block diagram illustrating a configuration of the ECU 3. In FIG. 2, for the ECU 3 included in the vehicle 1, the blocks related to communication and estimation for the time point of message generation are extracted and illustrated. Moreover, the ECU 2 has a configuration similar to the conventional ECU performing CAN communication, and thus the block diagram thereof is not illustrated. The ECU 3 according to the present embodiment is configured to comprise a processing unit 31, a read only memory (ROM) 32, a random access memory (RAM) 33, a CAN communication unit 34 and so forth. The processing unit 31 is configured with an arithmetic processing device (processor) such as a central processing unit (CPU) or a micro-processing unit (MPU). The processing unit 31 reads out and executes a program 32a stored in the ROM 32 to perform various information processing, control processing or the like concerning the vehicle 1.

The ROM 32 is configured with a non-volatile memory element such as a flash memory or an electrically erasable programmable ROM (EEPROM). The ROM 32 stores therein a program 32a executed by the processing unit 31 and various types of data necessary for processing performed based on the program 32a. According to the present embodiment, a delay time constant 32b used for estimating a time point of message generation is stored in the ROM 32.

The RAM 33 is configured with a data-rewritable memory element such as a static random access memory (SRAM) or a dynamic random access memory (DRAM). The RAM 33 stores various types of data generated by the processing performed by the processing unit 31. According to the present embodiment, the RAM 33 is provided with a transmission history storage part 33a which stores a history of messages transmitted on the CAN bus in the vehicle 1 (possibly including both a message transmitted by itself and a message transmitted by another ECU 2).

The CAN communication unit 34 performs communication with the ECUs 2 via the CAN bus in accordance with the CAN communication protocol. The CAN communication unit 34 converts information for transmission sent from the processing unit 31 into a signal according to the CAN communication protocol and outputs the converted signal to the CAN bus, to transmit a message to the ECUs 2. The CAN communication unit 34 obtains a signal output by the ECU 2 by sampling the potential at the CAN bus and receives a message by converting the signal into binary information in accordance with the CAN communication protocol, to send the received message to the processing unit 31.

If collision occurs between its own message transmission and the message transmission of a different ECU 2, the CAN communication unit 34 performs processing of adjusting the order of message transmission, i.e., arbitration processing. For a message transmitted by each of the ECUs 2 and 3, an ID is determined in advance in accordance with the type of the message. The ID is information handled as a numeric value. The smaller the value is, the higher the priority of the message transmission is. In the communication system, therefore, if transmission of multiple messages collide against one another on the CAN bus, the transmission of a message with the highest priority is performed, and the transmission of another message is performed after completing this message transmission. As the arbitration processing performed by the CAN communication unit 34 is an existing technique, the description of detailed processing procedure thereof is not described here.

The CAN communication unit 34 according to the present embodiment includes a sequential transmission detection part 34a detecting sequential transmission of messages to the CAN bus. The sequential transmission detection part 34a monitors messages transmitted on the CAN bus, obtains a time period from the time point when the transmission of one message is completed to the time point when the transmission of the next message is started, and determines that these two messages are transmitted in sequence if the obtained time period is less than a predetermined time period. More specifically, the sequential transmission detection part 34a detects the presence of an inter frame space (IFS) constituted of two or three recessive bits between seven recessive bits at the end of frame (EOF) in the preceding message and the start of frame (SOF) in the succeeding message, to detect the transmission of two sequential messages. In the case where the sequential transmission detection part 34a detects the transmission of sequential messages, the CAN communication unit 34 sends information related to the two sequential messages to the processing unit 31.

According to the present embodiment, the processing unit 31 in the ECU 3 executes the program 32a to implement a delay time estimation part 41, a generation time point estimation part 42 and the like as software functional blocks. It is to be noted that a part or whole of the delay time estimation part 41, the generation time point estimation part 42 and the like may be implemented as hardware functional blocks. In the case of receiving a message transmitted by a different ECU 2 through the CAN communication unit 34, the delay time estimation part 41 performs processing of estimating the time by which the message is delayed due to arbitration processing. Here, the delay time estimation part 41 performs estimation processing based on the history information stored in the transmission history storage part 33a in the RAM 33. The generation time point estimation part 42 performs processing of estimating the time point when the received message is generated at the ECU 2 from which the message is transmitted, based on the delay time estimated by the delay time estimation part 41 and the delay time constant 32b stored in the ROM 32.

<Estimation Processing>

Figure 3:
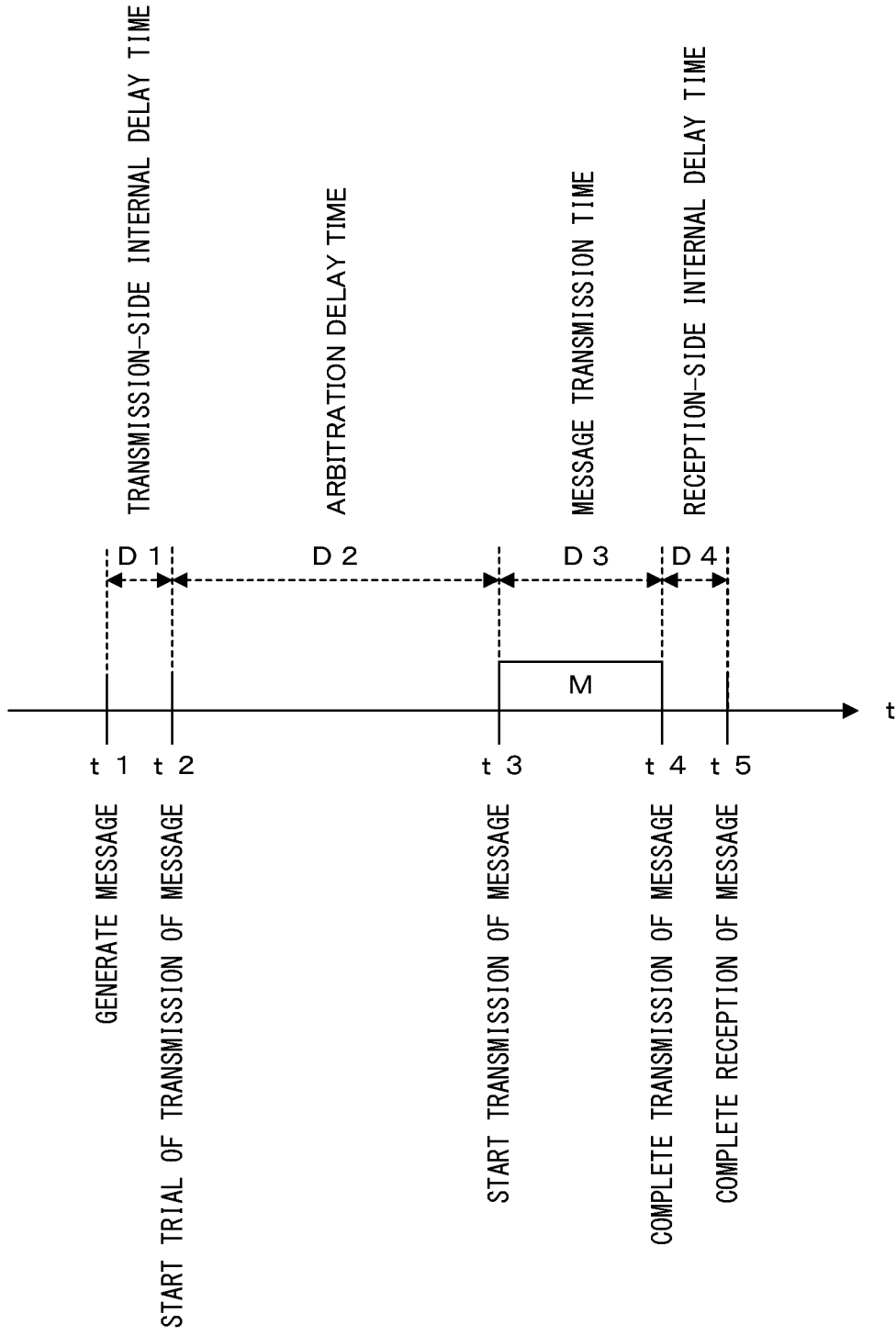
FIG. 3 is a schematic diagram for illustrating generation time point estimation processing performed by a generation time point estimation part in an ECU.

FIG. 3 is a schematic view illustrating the processing of estimating a generation time point performed by the generation time point estimation part 42 of the ECU 3, which shows a timing chart in the case where, for example, any one of the ECUs 2 transmits a message M and the ECU 3 receives the message M. If, as a result of the processing performed by an ECU 2a, a condition is satisfied under which information is to be transmitted to other ECUs 2 and 3, the ECU 2 generates a message M including information to be transmitted, a CAN-ID and so forth. In FIG. 3, the time point when the ECU 2 completes generating the message M is indicated as t1. After generating the message M, in the ECU 2, the message M is sent, for example, from the processing unit to the CAN communication unit, which starts outputting the initial bit in the message M to the CAN bus. In FIG. 3, the time period from the time point t1 when the message M is generated to the time point when the first output of the message M to the CAN bus is started, i.e., the time point t2 when the trial of transmission of the message M is started is represented as transmission-side internal delay time D1.

In the case where one of the ECUs 2 tries to transmit the message M at the same time when other ECUs 2 and 3 try to transmit messages, the transmission of multiple messages collide against one another, and arbitration processing is carried out among the ECUs 2 and 3. As a result of the arbitration processing, a message with a high priority (message with a small numeric value of CAN-ID) is transmitted first, and a delay occurs in the transmission of a message with a low priority. In FIG. 3, a time period from a time point t2 when the transmission of the message M is first tried to a time point t3 when the transmission of the message M is actually started is represented by arbitration delay time D2. If no collision occurs in the transmission of messages, t2=t3 and D2=0 are satisfied.

The ECU2 which started the transmission of the message M completes the transmission of the message M by outputting signals corresponding to all the bits in the message M to the CAN bus. In FIG. 3, a time period during which an ECU 2 is transmitting a message is represented by message transmission time D3, while the time point when the transmission of the message M is completed is represented by t4.

The message M transmitted by the ECU 2 is received by the ECUs 2 and 3 that need the message M. The CAN communication unit 34 of the ECU 3 may receive all the bits in the message M transmitted by the ECU 2 at the time point t4 by sampling the signal level of the CAN bus. The CAN communication unit 34 sends the received message M to the processing unit 31, which completes the processing of receiving the message M by the ECU 3. In FIG. 3, a time period from the time point t4 when the transmission of the message M by the ECU 2 is completed to the time when the reception of the message M by the ECU 3 is completed is represented by reception-side internal delay time D4.

The ECU 3 which received the message M from the ECU 2 may learn the time point t5 when the reception of the message M is completed. The generation time point estimation part 42 of the ECU 3 performs processing of estimating the time point t1 of message generation by going back from the time point t5 when the reception of the message is completed. More specifically, the generation time point estimation part 42 subtracts four periods of the delay time D1 to D4 from the time point t5 when the reception of the message is completed, to estimate the time point t1 of message generation.

The transmission-side internal delay time D1 caused by the ECU 2 on the transmission side is a time period which is determined depending on the device configuration of the ECU 2. Thus, a theoretical value, design value or the like of the delay time D1 is calculated, for example, at the design stage of the ECU 2, or the delay time D1 is measured in the actual operation of the ECU 2, and the theoretical value, measured value or the like of the transmission-side internal delay time D1 is stored in the ROM 32 as the delay time constant 32b. The transmission-side internal delay time D1 to be stored may be a common value for all the ECUs 2 or an individual value for each of the ECUs 2. The generation time point estimation part 42 may read out the delay time constant 32b from the ROM 32, to obtain the transmission-side internal delay time D1.

The arbitration delay time D2 is a time period which significantly varies in accordance with the number of collided messages in transmission and the priorities of the collided messages. Thus, the ECU 3 performs processing of estimating the arbitration delay time D2 at the delay time estimation part 41 with reference to the history of transmitted messages. The estimation processing by the delay time estimation part 41 will be described later in detail.

The message transmission time D3 is a time period determined uniquely from the number of bits in the received message M. The generation time point estimation part 42 obtains the message transmission time D3 in accordance with the number of bits in the received message. If a message transmitted and received between the ECUs 2 and 3 has a fixed length in the system, the generation time point estimation part 42 may store the message transmission time D3 as a fixed value. Moreover, if the ECU 3 is configured to treat the delay time D1 to D4 as the number of bits, not as actual time, the message transmission time D3 corresponds to the number of bits in the received message M.

The reception-side internal delay time D4 caused by the ECU 3 on the reception side is a time period which is determined depending on the device configuration of the ECU 3. Thus, as in the case of the transmission-side internal delay time D1, a theoretical value, design value or the like of the delay time D4 is calculated, for example, at the design stage or the like of the ECU 3, or the delay time D4 is measured in the actual operation of the ECU 3, and the theoretical value, measured value or the like of the transmission-side internal delay time D4 is stored in the ROM 32 as the delay time constant 32b. The generation time point estimation part 42 may read out the delay time constant 32b from the ROM 32, to obtain the reception-side internal delay time D4. In the case where the processing unit 31 may obtain the time point when the message M is received from the CAN communication unit 34 (i.e., time point t4 when the transmission of message is completed), the generation time point estimation part 42 may estimate the time point t1 of message generation by going back from the time point t4 when the transmission of message is completed, without using the reception-side internal delay time D4.

In comparison with the arbitration delay time D2 and the message transmission time D3, the transmission-side internal delay time D1 and the reception-side internal delay time D4 have very small values. Accordingly, the generation time point estimation part 42 may be configured to estimate the message generation time point t1 (=t2), assuming that D1=0 and D4=0.

Figure 4:
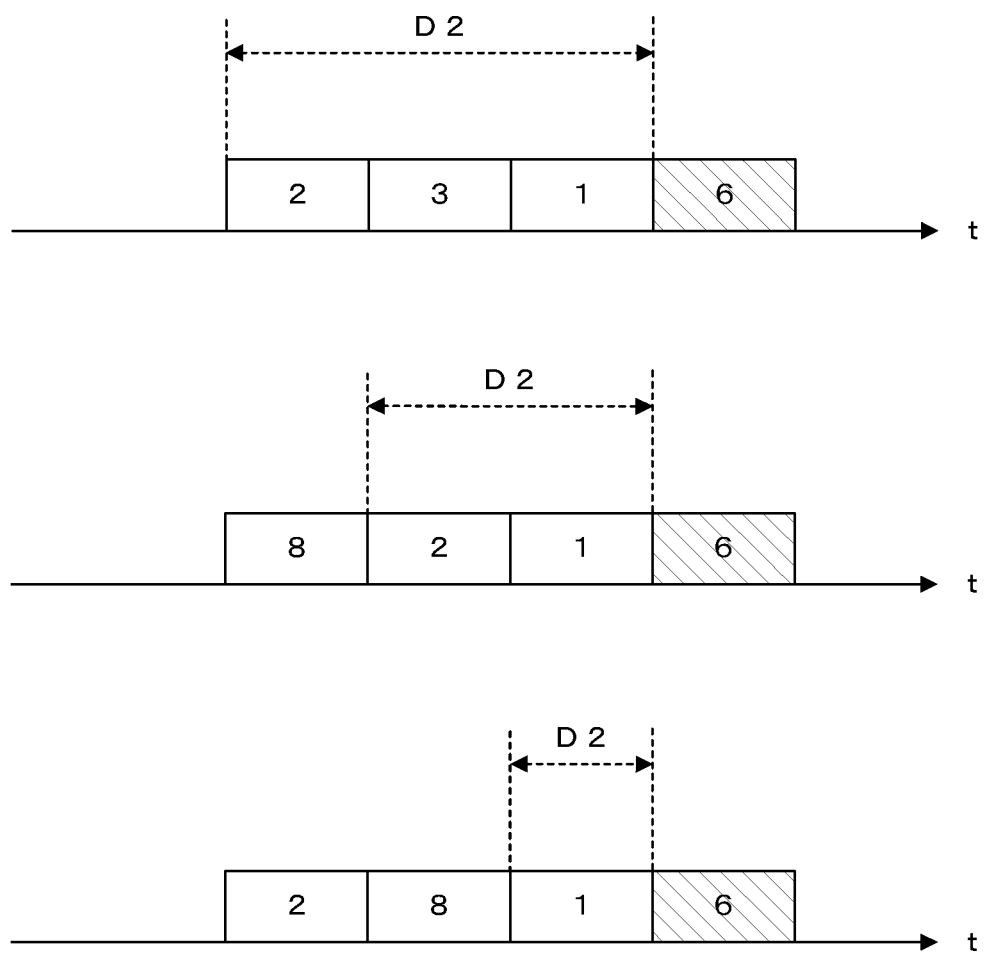
FIG. 4 is a schematic diagram for illustrating delay time estimation processing performed by a delay time estimation part in an ECU.

FIG. 4 is a schematic diagram for illustrating delay time estimation processing performed by the delay time estimation part 41 in the ECU 3, which shows three patterns of examples of messages transmitted onto the CAN bus. The rectangular regions illustrated in FIG. 4 correspond to messages, and numerical values indicated in the rectangular regions correspond to CAN-IDs. Furthermore, the ECU 3 receives a hatched message with the CAN-ID of 6, and the delay time estimation part 41 estimates the delay time D2 occurring due to arbitration for this message.

The CAN communication unit 34 of the ECU 3 detects the transmission of sequential messages to the CAN bus by the sequential transmission detection part 34a. If a time period from the time point when the transmission of one message is completed to the time point when the transmission of the next message is started is less than a predetermined time period, the sequential transmission detection part 34a determines that these two messages are transmitted in sequence. In the case where the sequential transmission detection part 34a detects the transmission of sequential messages, the sequential transmission detection part 34a notifies the processing unit 31 of information related to the sequential messages. Here, the sequential transmission detection part 34a notifies the processing unit 31 of the information concerning a time point when the transmission of the sequential messages are started, a time point when the transmission of the sequential messages are completed (or the length of message), CAN-IDs and so forth. The processing unit 31 stores the notified information in a transmission history storage part 33a of the RAM 33. The information stored in the transmission history storage part 33a may be deleted when, for example, a predetermined time elapses.

In the case where a message is received from the ECU 2, the delay time estimation part 41 of the ECU 3 determines whether or not another message is present sequentially preceding the received message by referring to the history stored in the transmission history storage part 33a. If no other sequentially preceding message is present, the delay time estimation part 41 determines that the arbitration delay time D2 is 0. If any other sequentially preceding message or messages are present, the delay time estimation part 41 checks the CAN-ID(s) of these one or more other messages and compares them with the CAN-ID of the received message. The delay time estimation part 41 searches for continuous messages with high priorities sequentially preceding the received message, obtains a time point when the transmission of the first transmitted message among the messages is started, and estimates that a time period from the time point when the transmission of the first message is started to the time point when the transmission of the received message is started corresponds to the arbitration delay time D2.

In the example illustrated at the upper part in FIG. 4, for example, four messages with the CAN-IDs of 2, 3, 1 and 6 are transmitted in this order, and the message with the CAN-ID of 6 is received by the ECU 3. Since the three messages transmitted prior to the received message all have high priorities, the delay time estimation part 41 in the ECU 3 obtains, from a history, a time point when the message with the CAN-ID of 2 which is transmitted earliest in the three messages. The delay time estimation part 41 estimates that a time period from the time point when the transmission of the message with the CAN-ID of 2 is started to the time point when the transmission of the received message with the CAN-ID of 6 is started corresponds to the arbitration delay time D2.

In the example illustrated at the middle part in FIG. 4, for example, four messages with the CAN-IDs of 8, 2, 1 and 6 are transmitted in this order, and the message with the CAN-ID of 6 is received by the ECU 3. The delay time estimation part 41 in the ECU 3 determines that, of the three messages transmitted prior to the received message, two messages with the CAN-IDs of 2, 1 are the messages having high priorities that are continuous without intermission prior to the received message. The delay time estimation part 41 obtains, from the history, a time point when the transmission of the message with the CAN-ID of 2 transmitted earliest of these two messages is started. The delay time estimation part 41 estimates that a time period from the time point when the transmission of the message with the CAN-ID of 2 is started to the time point when the transmission of the received message with the CAN-ID of 6 is started corresponds to the arbitration delay time D2.

In the example illustrated at the lower part in FIG. 4, for example, four messages with the CAN-IDs of 2, 8, 1 and 6 are transmitted in this order, and the message with the CAN-ID of 6 is received by the ECU 3. The delay time estimation part 41 in the ECU 3 determines that, of the three messages transmitted prior to the received message, the message with the CAN-ID of 1 is the only message having a high priority which is sequentially preceding the received message without intermission. The delay time estimation part 41 estimates that a time period from the time point when the transmission of the message with the CAN-ID of 1 is started to the time point when the transmission of the received message with the CAN-ID of 6 is started corresponds to the arbitration delay time D2.

It is noted that the arbitration delay time D2 estimated by the delay time estimation part 41 is merely an estimated value and may not match the actual delay time. For example, in the upper part of FIG. 4, in the case where the message with the CAN-ID of 2 is simultaneously transmitted with the message with the CAN-ID of 6 which is to be estimated and arbitration processing is performed, the estimated arbitration delay time D2 matches the actual delay time. On the contrary, in the upper part of FIG. 4, in the case where, for example, the message with the CAN-ID of 6 which is to be estimated is not transmitted at the time of transmitting the message with the CAN-ID of 2 and the message with the CAN-ID of 6 which is to be estimated is transmitted for the first time simultaneously with the subsequent message with the CAN-ID of 3 or 1, the actual delay time is shorter than the estimated arbitration delay time D2. For example, it is possible that the message with the CAN-ID of 6 which is to be estimated may be transmitted for the first time immediately after the transmission of the message with the CAN-ID of 1 is completed. That is, the arbitration delay time D2 estimated by the delay time estimation part 41 corresponds to a maximum delay time for the received message, and the actual delay time is in the range between 0 and D2.

Based on the arbitration delay time D2 estimated by the delay time estimation part 41, the transmission side internal delay time D1 as well as the reception side internal delay time D4 stored in the ROM 32 as the delay time constant 32b, and the message transmission time D3 of the received message, the generation time point estimation part 42 can estimate the generation time point t1 for the received message.

Figure 5:
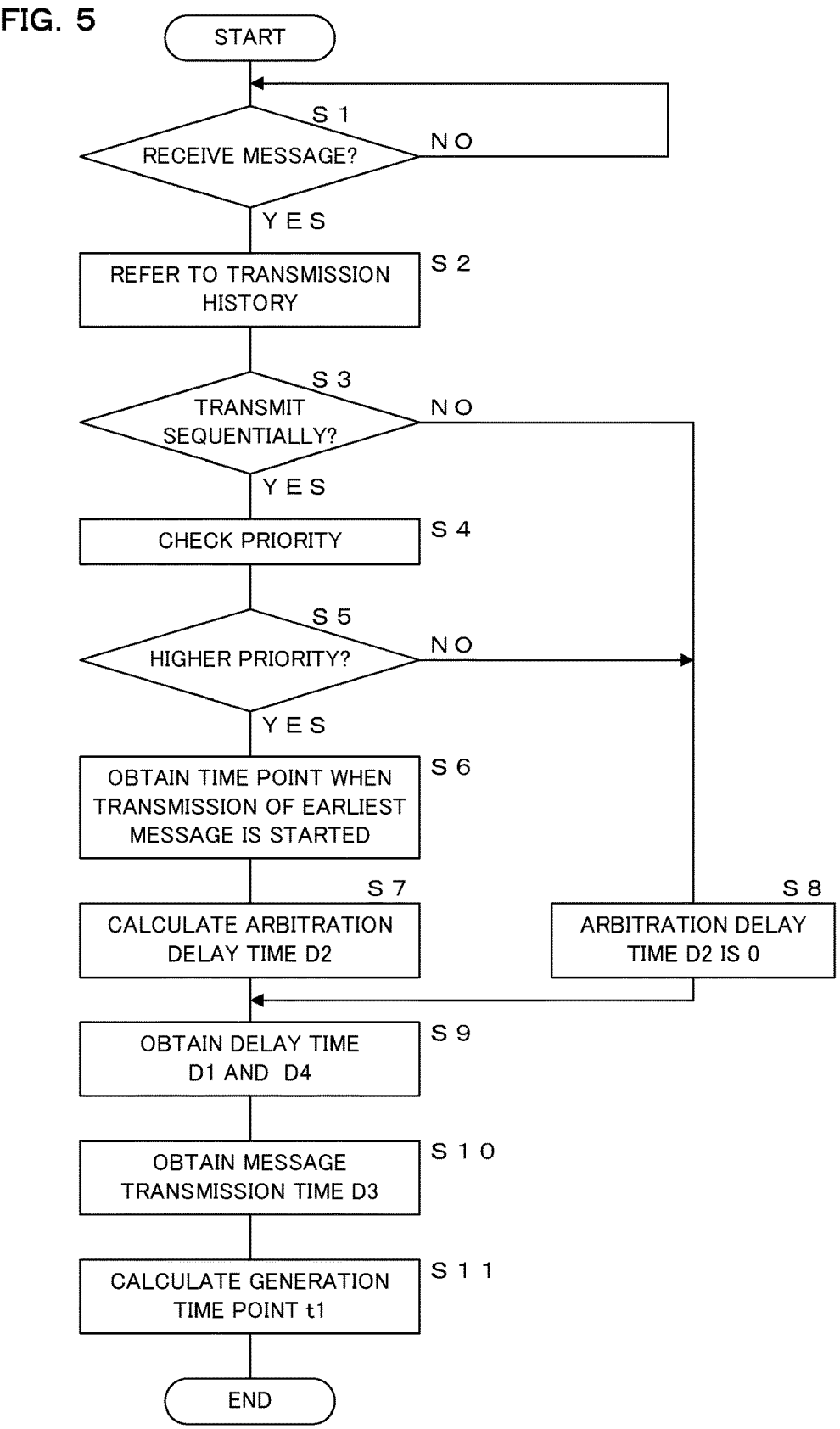
FIG. 5 is a flowchart illustrating the procedure of message generation time point estimation processing performed by an ECU.

FIG. 5 is a flowchart illustrating the procedure of message generation time point estimation processing performed by the ECU 3. The processing unit 31 of the ECU 3 determines whether or not a desired message is received at the CAN communication unit 34 from an ECU 2 (step S1). If the message is not received (S1: NO), the processing unit 31 waits until the message is received. If the desired message is received (S1: YES), the delay time estimation part 41 of the processing unit 31 refers to a transmission history stored in the transmission history storage part 33a of the RAM 33 (step S2). The delay time estimation part 41 determines whether or not another message transmitted sequentially preceding the received message that is received at step S1 is present based on the stored transmission history (step S3). If no other sequentially preceding message is present (S3: NO), the delay time estimation part 41 determines that the arbitration delay time D2 is 0 (step S8), and proceeds to step S9.

If another message transmitted sequentially preceding the received message is present (S3: YES), the delay time estimation part 41 checks the priority of this another preceding message based on the history information stored in the transmission history storage part 33a (step S4). The delay time estimation part 41 determines whether or not a message with a priority higher than that of the received message is present in one or more other messages sequentially preceding the received message (step S5). If no other sequentially preceding message with a higher priority is present (S5: NO), the delay time estimation part 41 determines that the arbitration delay time D2 is 0 (step S8), and proceeds to step S9.

If a message with a higher priority is present (S5: YES), the delay time estimation part 41 obtains, from the transmission history stored in the transmission history storage part 33a, the time point when transmission of the earliest message (that is, the message having the earliest starting time point of transmission), among the messages with high priorities sequentially transmitted without intermission prior to the received message, is started (step S6). The delay time estimation part 41 calculates the arbitration delay time D2 based on the difference between the time point when the earliest message with a high priority obtained at step S6 and the time point when transmission of the received message received at step S1 is started (step S7), and proceeds to step S9.

Subsequently, the generation time point estimation part 42 of the processing unit 31 obtains the transmission side internal delay time D1 and the reception side internal delay time D4 stored in the ROM 32 as the delay time constant 32b (step S9), and also obtains the transmission time D3 of the received message that is received at step S1 (step S10). The generation time point estimation part 42 calculates generation time point t1 of the received message based on the transmission side internal delay time D1, arbitration delay time D2, message transmission time D3, reception side internal delay time D4 and the time point t4 when the reception of the received message is completed (step S11), and terminates the processing.

The communication system according to the present embodiment configured as described above comprises a function of at least one ECU 3 estimating the delay time D2 of the message occurring due to arbitration processing. The ECU 3 detects by the sequential transmission detection unit 34a of the CAN communication unit 34 sequential transmission of messages by the ECU 2 to the CAN bus, and determines by the delay time estimation part 41 whether or not the message received by itself is transmitted in sequence with another message. If the received message is transmitted sequentially with another message, the received message may be delayed due to the arbitration processing, and thus the delay time estimation part 41 checks the priority (CAN-IDs) of one or more other messages sequentially preceding the received message, and estimates the time by which the received message is delayed due to the arbitration processing, in accordance with the priority of each message.

Such a configuration of estimating the delay time of a received message occurring due to arbitration processing eliminates the need for any special processing performed by the ECU 2 on the message transmission side, so that this function may be mounted only to the ECU 3 required for estimation of the delay time of the received message. As feature expansion may be performed only for a required communication device in the conventional communication system performing communication based on the CAN protocol, the communication system according to the present embodiment may be implemented at low cost.

In the case where other messages sequentially preceding the received message have higher priorities than the priority of the received message, it is possible that the received message is delayed because of collision against these other messages. On the other hand, if the priorities of other messages are lower than the priority of the received message, the transmission of the received message is prioritized in the arbitration processing, and thus the received message is not delayed due to collision against other messages. The delay time estimation part 41 searches for messages with high priorities sequentially preceding the received message without intermission, and estimates the delay time in accordance with the time point when transmission of the earliest one of such messages with a high priority is started. Accordingly, the time by which the received message is delayed due to arbitration processing with another message having a high priority may be estimated.

The generation time point estimation part 42 of the ECU 3 estimates the time point when the received message is generated by the ECU 2 from which the message is transmitted, based on the delay time estimated by the delay time estimation part 41. The generation time point estimation part 42 estimates a generation time point t1 of the message based on the delay time D1 from generation to transmission of a message by the ECU 2 on the transmission side, the delay time D2 occurring due to estimated arbitration processing, the transmission time D3 of the message, and the delay time D4 from completion of message transmission by the ECU 2 on the transmission side to completion of message reception by the ECU 3 on the reception side. The transmission side internal delay time D1 and the reception side internal delay time D4 are stored as a design value, a measured value or the like in the ROM 32 of the ECU 3 as a delay time constant 32*b*.

This allows the ECU 3 to estimate a time point when the received message is generated. For example, the ECU 2 transmits a detected value obtained by a sensor such as a vehicle speed sensor or a temperature sensor, and if the ECU 3 is in a system carrying out feedback control or the like in accordance with a detected value included in the message, the ECU 3 estimates the delay time for the message and the generation time point of the message to allow itself to perform control with higher precision. For example, in the case where the ECU 3 performs synchronous processing in accordance with a message from the ECU 2, for example, the ECU 3 may estimate the delay time for the message to implement synchronization with higher precision.

If the interval between the time point when transmission of one message is completed and the time point when transmission of the subsequent message is started is less than a predetermined period of time (e.g., predetermined period of time in accordance with two bits or three bits in IFS), the communication transmission detection part 34*a* determines that these two messages are in sequence with each other. The ECU 3 stores information such as a time point when transmission is started and priorities of the messages determined as being sequential by the sequential transmission detection part 24*a* in the transmission history storage part 33*a* of the RAM 33. This allows the delay time estimation part 41 to perform processing of, for example, determining whether or not the received message is transmitted in sequence with another message and estimating delay time based on the priority of another message transmitted in sequence with the received message.

While the present embodiment has such a configuration that the processing, such as delay time estimation processing by the delay time estimation part 41 and generation time point estimation processing by the generation time point estimation part 42, is performed by the processing unit 31 (so-called CPU, processor or the like), it is not limited thereto but such processing procedures may be performed by the CAN communication unit 53 (so-called CAN controller). Furthermore, the processing of detecting sequential transmission of messages by the sequential transmission detection part 34*a* may be performed by the processing unit 31, not by the CAN communication part 34.

Moreover, while the ECU 3 is configured to store information about the messages determined as being sequential by the sequential transmission detection part 34*a* in the transmission history storage part 33*a*, it is not limited thereto but, for example, the history of all the messages transmitted on the CAN bus may be stored. In this case, it is not necessary for the CAN communication unit 34 to perform processing by the sequential transmission detection part 34*a*, but it may be determined whether or not the messages stored in the transmission history storage part 33*a* are sequential when the processing unit 31 performs processing of estimating delay time.

According to the present embodiment, description is made to an example of the communication system mounted to the vehicle 1, the communication system is not limited to the one mounted to the vehicle 1 but may also be a system mounted to a movable object such as an airplane or a vessel for example, or may be installed in a factory, an office, a school or the like for example, not in a movable object.

Embodiment 2

Figure 6:
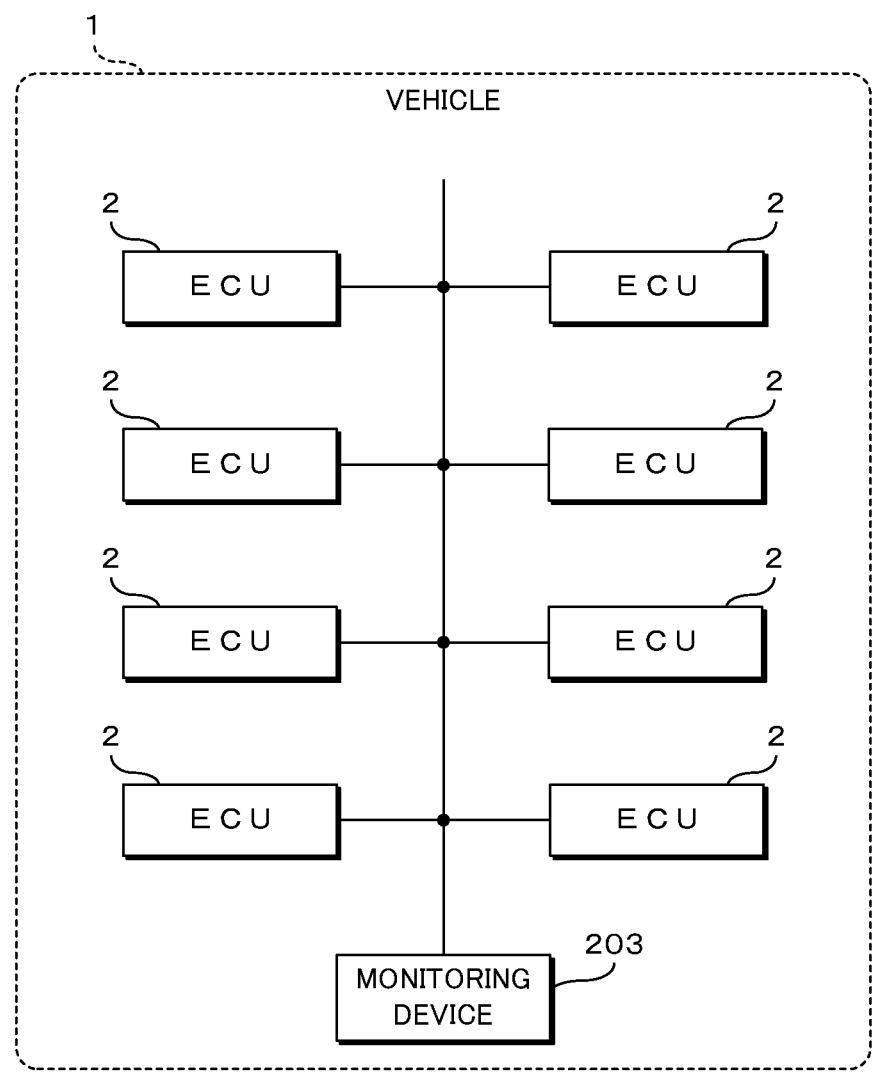
FIG. 6 is a schematic diagram illustrating a configuration of a communication system according to Embodiment 2.

FIG. 6 is a schematic diagram illustrating a configuration of a communication system according to Embodiment 2. The communication system according to Embodiment 2 is configured by comprising multiple ECUs 2 and one monitoring device 203 mounted to the vehicle 1. The ECUs 2 and monitoring device 203 are connected with one another via a CAN bus installed in the vehicle 1, and can transmit and receive messages to/from one another. The monitoring device 203 is a device for monitoring fraudulent message transmission to an in-vehicle network. The monitoring device 203 may be provided as a device dedicated for monitoring, configured with a monitoring function added to a device such as a gateway for example, or configured with a monitoring function added to the ECU 3 according to Embodiment 1, for example.

The ECU 2 according to the present embodiment periodically performs processing of obtaining information such as information sensed by a sensor or feedback information from equipment to be controlled, creating a message including the obtained information based on the CAN protocol, and transmitting the created message to the CAN bus. It is noted that the transmission cycle of messages is determined for each CAN-ID, and thus the ECU 2 may transmit messages at different cycles for different CAN-IDs.

Figure 7:
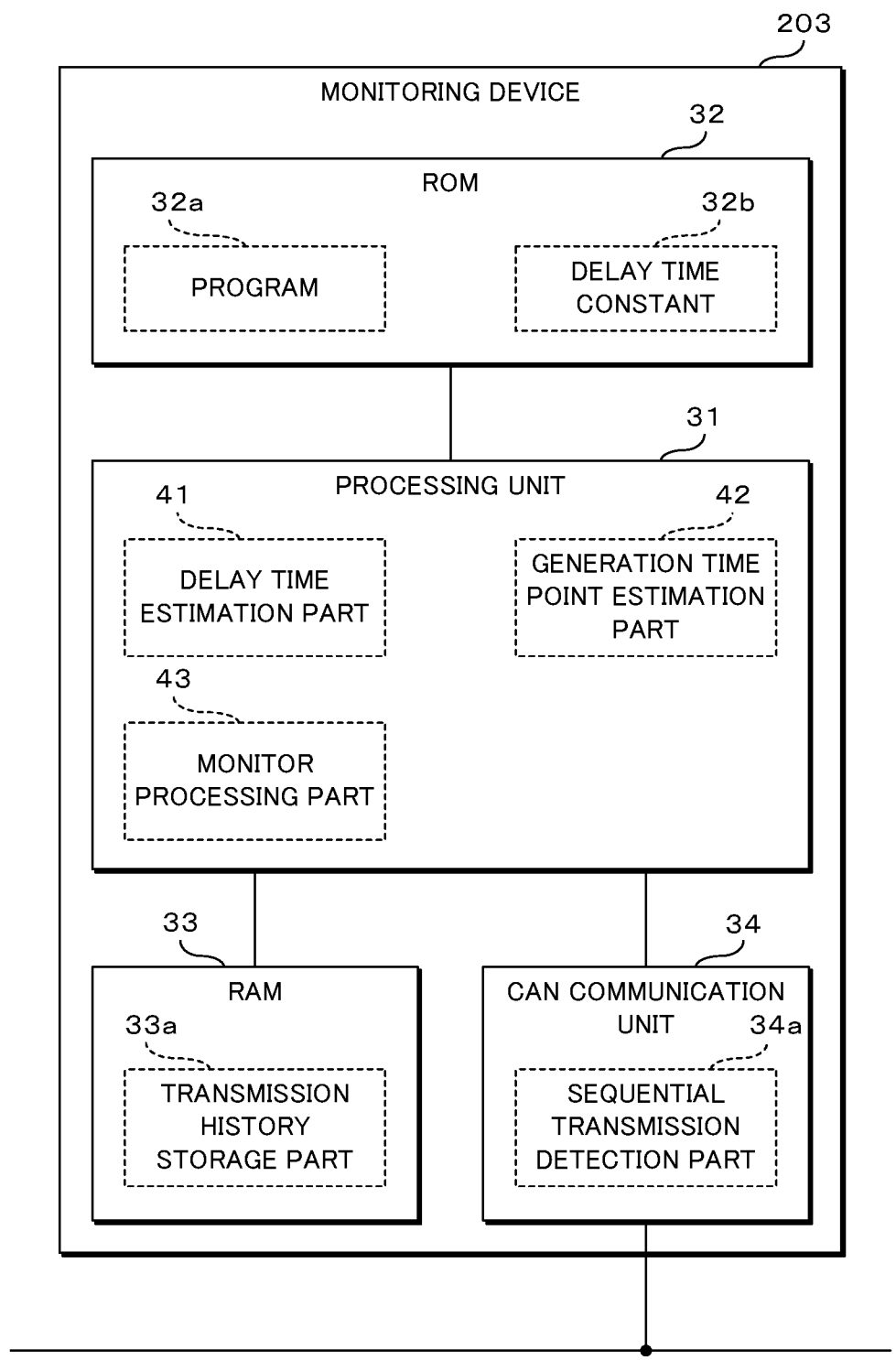
FIG. 7 is a block diagram illustrating a configuration of a monitoring device.

FIG. 7 is a block diagram illustrating a configuration of the monitoring device 203. The monitoring device 203 according to Embodiment 2 has a delay time estimating function as well as a generation time point estimating function similar to those of ECU 3 according to Embodiment 1, while comprising in the processing unit 31 a monitor processing part 43 performing processing of monitoring transmission of a fraudulent message.

As for a fraudulent message, for example, a fraudulent communication device may improperly be connected to the CAN bus, which may transmit a fraudulent message onto the CAN bus. For example, improper modification or alteration is made on any one of the ECUs 2 mounted on the vehicle 1, and this ECU 2 may transmit a fraudulent message. These are mere examples of fraudulent messages, and the fraudulent message detected by the monitoring device 203 may be caused by a factor other than the above.

A fraudulent communication device may transmit a fraudulent message with a specific CAN-ID in accordance with the CAN protocol. While the CAN-ID attached to such a fraudulent message is a valid one used in the communication system of the vehicle 1, the other data included in the fraudulent message is fraudulent. If an ECU 2 receives a fraudulent message based on a CAN-ID, it will perform processing based on fraudulent data. The communication system according to Embodiment 2 is to detect a fraudulent message with a valid CAN-ID attached thereto, a so-called spoofing message.

Figure 8:
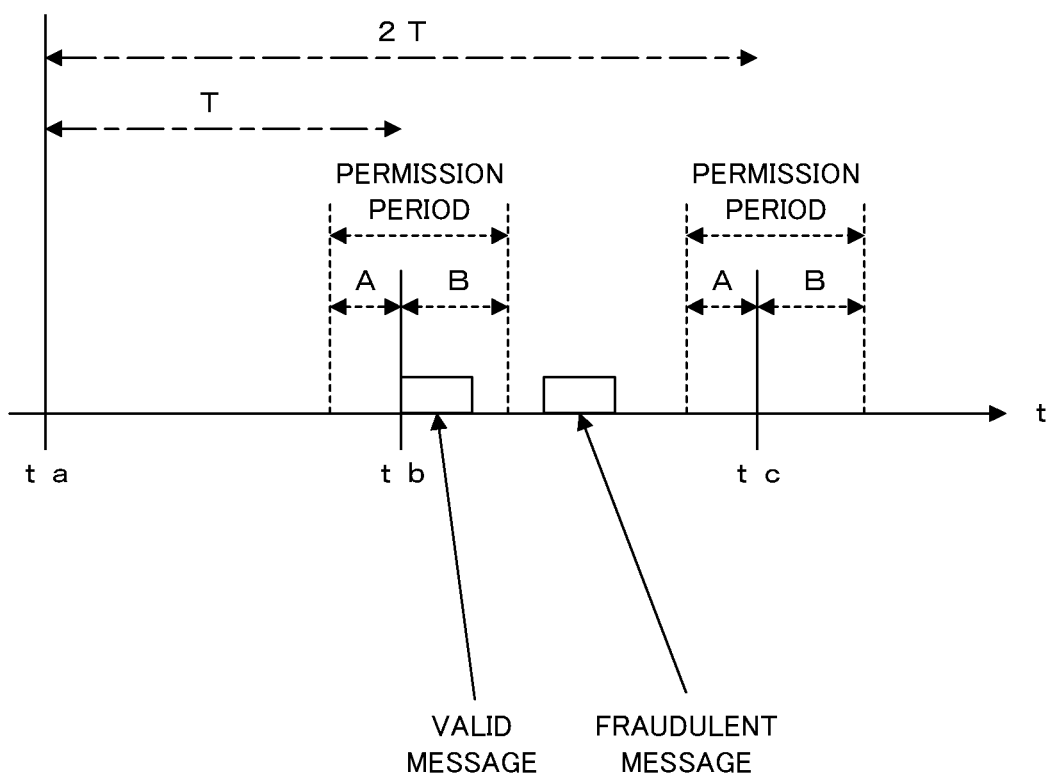
FIG. 8 is a schematic view for illustrating fraudulent message detection processing performed by the monitoring device.

The monitoring device 203 according to Embodiment 2 determines whether or not a message to be transmitted periodically is transmitted at correct cycles, to detect a fraudulent message. FIG. 8 is a schematic view for illustrating fraudulent message detection processing performed by the monitoring device 203. The monitoring device 203 decides, for each CAN-ID attached to the message transmitted and received in the communication system, a permission periods during which transmission of a message having a CAN-ID is permitted. FIG. 8 illustrates a permission period decided by the monitoring device 203, for a message with one CAN-ID attached thereto. It is to be noted that Embodiment 2 does not include a case where one CAN-ID is used by more than one ECUs 2, i.e. a case where a message with the same CAN-ID is transmitted by multiple ECUs 2.

In the present embodiment, a transmission cycle of a message to be monitored by the monitoring device 203 is denoted by T. A monitor processing part 43 in the monitoring device 203 performs a predetermined procedure with the ECU 2 to which the message is transmitted, to decide a reference time point to of message transmission. For example, the monitoring device 203 transmits a message including a request for performing processing of deciding the reference time point ta to the ECU 2. The ECU 2 which received the message transmits a response message to the monitoring device 203, while setting the time point when the response message is generated as the reference time point ta. The monitoring device 203 which received the response message from the ECU 2 performs delay time estimation processing by the delay time estimation part 41 and generation time point estimation processing by the generation time point estimation part 42 with respect to the response message, with a procedure similar to that for the ECU 3 according to Embodiment 1. The monitoring device 203 sets the estimated time point of message generation with respect to the response message, as the reference time point ta.

Though the time point when the response message is generated (t1 in FIG. 3) is set as the reference time point ta in the present embodiment, a time point other than this may also be set as the reference time point ta. For example, a time point when the ECU 2 starts trying to transmit a response message (t2 in FIG. 3) may also be set as the reference time point ta. Moreover, in the case where, for example, the delay time estimated by the delay time estimation part 41 is a predetermined time or more, the ECU 2 and monitoring device 203 may perform the processing of deciding the reference time point ta again.

The monitor processing part 43 in the monitoring device 203 sets a time point tb obtained by adding the transmission cycle T to the reference time point ta as a scheduled transmission time point tb for a message. Likewise, the monitor processing part 43 sets a time point tc obtained by adding twice the transmission cycle T to the reference time point ta as a scheduled transmission time point tc. Same applies to the subsequent scheduled transmission time points. The monitor processing part 43 decides a period obtained by setting a margin of a predetermined period A and period B with respect to the scheduled transmission time point tb as a permission period. The monitor processing part 43 decides a period of tb−A≤t≤tb+B as a permission period. Same applies to the scheduled transmission time point tc and later. The period A and period B for deciding the permission period is decided in advance based on, for example, simulation of the communication system or a measurement result in an actual machine. As for the period A and period B, the same value may be used for all messages, or different values may be used for each CAN-ID, for example. The period A may be decided based on, for example, a clock error between the monitoring device 203 and the ECU 2 which transmits the message. The period B may be decided in consideration of the time by which the message is delayed due to arbitration processing.

The CAN communication unit 34 in the monitoring device 203 monitors transmission of a message to the CAN bus, and if detecting the message transmission, notifies the processing unit 31 thereof. The monitor processing part 43 of the processing unit 31 obtains information related to the CAN-ID of a transmitted message and a time point when the message transmission is started or finished, based on the notification from the CAN communication unit 34. Moreover, the monitor processing part 43 determines whether or not the message detected for its transmission is transmitted during a permission period. If the message is not the one transmitted during the permission period, the monitor processing part 43 determines that the message is a fraudulent message, and makes the ECU 2 connected to the CAN bus discard the message.

A message transmitted and received in the communication system according to the present embodiment is in accordance with the CAN protocol and is configured to include a CAN header, a data field, a Cyclic Redundancy Check (CRC) field, an ACK field, an End Of Frame (EOF) and so forth. The CAN header includes a Start of Frame (SOF), an arbitration field, a control field and so forth based on the conventional CAN protocol, and a CAN-ID described above is set in the arbitration filed. The data field stores therein the main body of information to be transmitted and received between ECUs 2, such as an instruction to control an ECU 2, a result sensed by a sensor or the like, for example. The CRC field, ACK field and EOF are the same as those used in the conventional CAN protocol, and thus will not be described in detail. The CRC field stores therein information for detecting an error. The ACK field is a field for responding reception by an ECU 2 which receives the frame. The EOF is a specific bit string indicating the end of a field.

The monitor processing part 43 in the monitoring device 203 transmits, for a message determined that its transmission is not permitted, an error frame to the CAN bus during the output period of the EOF of the message. This error frame allows all the ECUs 2 connected to the CAN bus to discard fraudulent messages during reception.

The communication system according to Embodiment 2 with the configuration described above can enhance the reliability of the vehicle 1 by the monitoring device 203 detecting fraudulent message transmission to the CAN bus from a fraudulent device. In the processing of deciding a reference time point with the ECU 2 necessary for monitor processing, the monitoring device 203 estimates a time point when a response message received from the ECU 2 is generated, and sets the estimated time point as the reference time point ta. This allows the reference time point ta of the monitoring device 203 to precisely match the reference time point ta of the ECU 2, thereby allowing the monitoring device 203 to precisely perform monitor processing.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A communication system, comprising:
a plurality of communication devices connected to each other via a common communication line, and each including a message generation circuit generating a message with information concerning a priority,
a message transmission circuit outputting a signal in accordance with the message generated by the message generation circuit to the communication line to transmit the message; and
a message reception circuit obtaining a signal by sampling for the communication line to receive the message concerning the signal in accordance with the information; and
an arbitration circuit arbitrating an order of transmission in accordance with priorities of messages in a case where transmission of the messages by the plurality of communication devices collide against each other, the plurality of communication devices transmitting and receiving the message to and from each other via a common communication line, wherein at least one of the communication devices includes a determination circuit determining whether or not the message received by the message reception circuit is transmitted in sequence with another message via the common communication line; and
a delay time estimation circuit of the communication device which receives the message estimates a delay time of the received message by processing a determination of the determination circuit and an arbitration of the arbitration circuit, wherein the delay time is estimated if the determination circuit determines that the received message is transmitted in sequence, the delay time caused by the arbitration circuit is made in accordance with a priority of sequential one or more messages preceding the received message, wherein the delay time is further estimated in accordance with a transmission time period for another message with a high priority sequentially preceding the received message.

2. The communication system according to claim 1, wherein the at least one communication device includes a generation time point estimation circuit estimating a time point when the received message is generated by the message generation circuit, based on the delay time estimated by the delay time estimation circuit.

3. The communication system according to claim 2, wherein the generation time point estimation circuit estimates the time point when the message is generated, on a basis of: delay time from time when the message is generated by the message generation circuit to time when the message is transmitted by the message transmission circuit; the delay time estimated by the delay time estimation circuit; a time period from start to end of message transmission; and delay time from completion of the message transmission by the communication device on the transmission side to completion of the message reception by the communication device on the reception side.

4. The communication system according to claim 2, wherein, if an interval between the time point when transmission of one message is completed and the time point when transmission of a subsequent message is started is less than a predetermined period of time, the determination circuit determines that the two messages are sequentially transmitted.

5. The communication system according to claim 2, wherein for the message detected as at least being sequentially transmitted, the at least one communication device has a history storage circuit storing a history of message transmission including information concerning the time point when the message is transmitted and a priority of the message, and the determination circuit is configured to make determination based on the history stored in the history storage circuit.

6. A communication device connected to a different device via a common communication line, comprising:
a message generation circuit generating a message with information concerning a priority;
a message transmission circuit outputting a signal in accordance with the message generated by the message generation circuit to the communication line to transmit the message;
a message reception circuit obtaining a signal by sampling for the communication line to receive the message concerning the signal in accordance with the information; and
an arbitration circuit arbitrating an order of transmission in accordance with a priority of the message in a case where transmission of messages collide against each other between the communication device and the different device, the communication device transmitting the message to the different device and receiving the message from the different device via a common communication line, further comprising:
a determination circuit determining whether or not the message received by the message reception circuit is transmitted in sequence with another message via the common communication line; and
a delay time estimation circuit of the communication device which receives the message, estimates a delay time of the received message by processing a determination of the determination circuit and an arbitration of the arbitration circuit, wherein the delay time is estimated if the determination circuit determines that the received message is transmitted in sequence, the delay time caused by the arbitration circuit is made in accordance with a priority of sequential one or more messages preceding the received message, wherein the delay time is further estimated in accordance with a transmission time period for another message with a high priority sequentially preceding the received message.

* * * * *